(12) United States Patent
Reasor (10) Patent No.: US 11,720,339 B2
(45) Date of Patent: Aug. 8, 2023

(54) SYSTEMS AND METHODS FOR UPDATING AUTOMATIC TELLER MACHINES

(71) Applicant: Capital One Services, LLC, McLean, VA (US)

(72) Inventor: Robert Reasor, Richmond, VA (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 45 days.

(21) Appl. No.: 17/328,219

(22) Filed: May 24, 2021

(65) Prior Publication Data

US 2022/0374222 A1   Nov. 24, 2022

(51) Int. Cl.
*G06F 8/65* (2018.01)
*G06F 8/61* (2018.01)
*G07F 19/00* (2006.01)

(52) U.S. Cl.
CPC .............. *G06F 8/65* (2013.01); *G06F 8/63* (2013.01); *G07F 19/211* (2013.01)

(58) Field of Classification Search
CPC ............ G06F 8/65; G06F 8/63; G07F 19/211
See application file for complete search history.

(56) References Cited

U.S. PATENT DOCUMENTS

| | | | | |
|---|---|---|---|---|
| 6,422,475 B1 * | 7/2002 | May | .................... | G07F 19/2055 235/492 |
| 6,968,321 B1 | 11/2005 | Yu | | |
| 7,284,694 B2 | 10/2007 | Ferraro | | |
| 8,281,985 B1 * | 10/2012 | Steinmetz | .......... | G06Q 20/1085 235/379 |

(Continued)

FOREIGN PATENT DOCUMENTS

| | | | | |
|---|---|---|---|---|
| CN | 1280686 A | * | 1/2001 | ............. G06Q 20/18 |
| CN | 106991767 A | * | 7/2017 | |

(Continued)

OTHER PUBLICATIONS

Jepsen et al., "Linux Update: an Experimental ATM Network",1999, IEEE (Year: 1999).*

(Continued)

*Primary Examiner* — Wei Y Zhen
*Assistant Examiner* — Junchun Wu
(74) *Attorney, Agent, or Firm* — Troutman Pepper Hamilton Sanders LLP; Christopher J. Forstner; John A. Morrissett (57) ABSTRACT

Disclosed herein are systems and methods for deploying and/or rolling back automatic teller machine (ATM) updates. Such methods can store a back-up system image of a client operating system on a virtual hard drive. When an update is deployed from a host operating system to the client operating system, the system update may fail to install properly, and the ATM may shut down. In response, the host operating system can execute instructions to the client operating system to boot from a bootable image on the virtual hard drive. Then, the virtual hard drive can emulate, by a boot loader on the back-up system image, the client operating system on the ATM from the virtual hard drive without loading the client operating system. Then, the virtual hard drive can install a rolled-back operating system on the ATM. The rolled-back operating system can comprise the back-up system image.

18 Claims, 5 Drawing Sheets

(56) References Cited

U.S. PATENT DOCUMENTS

| | | | |
|---|---|---|---|
| 8,312,212 B2 | 11/2012 | Tolba | |
| 8,474,704 B1 | 7/2013 | Grimm et al. | |
| 8,893,962 B2 | 11/2014 | Ma et al. | |
| 8,949,585 B2 | 2/2015 | Hiltgen et al. | |
| 9,015,129 B2 | 4/2015 | Timashev et al. | |
| 9,130,903 B2 | 9/2015 | Ryman | |
| 9,578,088 B2* | 2/2017 | Nickolov | H04L 67/1031 |
| 9,983,956 B2 | 5/2018 | Munson et al. | |
| 10,282,221 B2 | 5/2019 | Arcese et al. | |
| 10,360,010 B1* | 7/2019 | Maehler | G07F 19/207 |
| 10,397,230 B2* | 8/2019 | Callaghan | H04L 63/101 |
| 2004/0215566 A1* | 10/2004 | Meurer | G06Q 10/10 |
| | | | 705/43 |
| 2008/0195540 A1* | 8/2008 | Gee | G07F 19/203 |
| | | | 235/379 |
| 2012/0194319 A1 | 8/2012 | Kang et al. | |
| 2012/0324278 A1 | 12/2012 | Dent | |
| 2015/0220381 A1 | 8/2015 | Horgan | |
| 2015/0248336 A1* | 9/2015 | Han | G06F 11/1469 |
| | | | 711/162 |
| 2016/0103741 A1* | 4/2016 | Kobres | G06F 9/4416 |
| | | | 714/19 |
| 2017/0346851 A1* | 11/2017 | Drake | H04L 9/0838 |
| 2018/0074886 A1* | 3/2018 | Ewington | G06F 11/0778 |
| 2018/0225459 A1* | 8/2018 | Zarakas | G06K 19/07381 |
| 2019/0371132 A1* | 12/2019 | Hecker | G06F 9/466 |
| 2019/0378101 A1* | 12/2019 | Benkreira | G06Q 20/105 |
| 2022/0374222 A1* | 11/2022 | Reasor | G06F 8/65 |

FOREIGN PATENT DOCUMENTS

| | | | | |
|---|---|---|---|---|
| CN | 109785537 A | * | 5/2019 | |
| CN | 111080929 A | * | 4/2020 | G07F 19/00 |
| CN | 107133821 B | * | 2/2021 | G06Q 30/0283 |
| CN | 112784136 A | * | 5/2021 | |
| WO | 2018227772 A1 | | 12/2018 | |
| WO | WO-2020041324 A1 | * | 2/2020 | G06F 1/3212 |

OTHER PUBLICATIONS

Leppakoski, "Life Cycle Management for Programmable Machine Control Platform",Feb. 2013, Tampere University of Technology (Year: 2013).*

Ahuja et al., "Generating Project Plans for Data Center Transformations", 2012, Springer-Verlag Berlin Heidelberg, pp. 767-778 (Year: 2012).*

Toegl et al., "An approach to introducing locality in remote attestation using near field communications", Mar. 2019, Springer Science+Business Media, LLC (Year: 2019).*

Extended European Search Report in related EP Application No. EP22175184.5, dated Oct. 13, 2022.

* cited by examiner

SYSTEMS AND METHODS FOR UPDATING AUTOMATIC TELLER MACHINES

FIELD OF THE DISCLOSURE

Examples of the present disclosure relate generally to systems and methods for updating automatic teller machines (ATMs). Particularly, examples of the present disclosure relate to systems and methods for deploying and rolling back updates to ATMs.

BACKGROUND

Automatic teller machines (ATMs) have become a ubiquitous part of everyday life. ATMs are widely used to make transactions with a variety of financial instruments because they often provide for quick, easy, and more convenient service than, for example, interaction at a bank with a teller. However, ATMs exist as very specialized machines, requiring dedicated service technicians to maintain proper service and keep the ATMs online. Should an ATM experience a significant error, the downtime of the ATM can be catastrophic. More often than not, broken ATMs must remain out of service until a dedicated service technician can physically attend to the ATM to bring the machine back online.

This same problem can arise during attempts to update the software on an ATM, such as an ATM operating system. Because ATMs exist as such specialized machines, current ATM update deployment environments lack the ability to rollback a machine after an update deployment. This means that if an update deployment or other change to the ATM leaves the machine in a non-functional state, the machine must be freshly imaged, which can take several hours of downtime. Additionally, as stated above, such a remedy can require a costly and time-consuming call to a dedicated service technician to manually image the machine, perform the software install, and/or bring the machine back online.

What is needed, therefore, are systems and methods that can provide and deploy updates to ATMs remotely, rollback software updates to ATMs without a service technician, and bring non-functional ATMs back online. Examples of the present disclosure address this need as well as other needs that will become apparent upon reading the description below in conjunction with the drawings.

BRIEF SUMMARY

Examples of the present disclosure relate generally to automatic teller machine (ATM) update systems and methods thereto. Particularly, examples of the present disclosure relate to systems and methods for deploying and rolling back updates to ATMs.

Examples of the present disclosure can include a method for rolling back an update to an automatic teller machine (ATM). The method can comprise storing a virtual hard drive comprising a file system corresponding to a client operating system of the ATM. The virtual hard drive can also comprise a back-up system image of the client operating system. A host operating system can store the virtual hard drive.

The method can further comprise deploying a system update from the host operating system intended for the client operating system. The method can then determine that the system update failed to install properly on the client operating system and that the ATM has shut down. In response, the method can emulate the virtual hard drive on the ATM without loading the client operating system. Then, the method can install a rolled-back operating system from the virtual hard drive on to the ATM. The rolled-back operating system can comprise the back-up system image of the client operating system. The method can then receive a patch that has altered the system update to create a patched system update intended for the client operating system, and the method can deploy the patched system update to the rolled-back operating system on the ATM.

The method can further comprise accessing a bootable image comprising the back-up system image of the client operating system. The bootable image can further comprise a boot loader that defines at least one transformation to be performed on the bootable image to allow the ATM to boot from the back-up system image. The method can further comprise executing the boot loader and thereby performing the at least one transformation, and booting the ATM using the transformed bootable image.

Responsive to deploying the patched system update to the rolled-back operating system, the method can determine that the patched system update failed to install properly on the rolled-back operating system and that the ATM has shut down. In response, the method can run instructions from the host operating system to the rolled-back operating system to access the file system of the virtual hard drive. Furthermore, the method can automatically instruct the host operating system to terminate the deployment of system updates to the ATM. Alternatively, or in addition, the method can transmit an alert from the host operating system that the ATM requires service by a technician, and/or the method can cause a user interface (UI) of the ATM to display a graphical user interface (GUI) indicating that the ATM is out of service.

Examples of the present disclosure can additionally include an ATM update system, comprising one or more processors and a memory storing instructions to be executed by the one or more processors. The instructions can cause the ATM update system to store a back-up system image of a client operating system on a host operating system comprising a virtual hard drive. The system image can comprise a bootable image and a boot loader. The instructions can further cause the system to deploy a system update intended for the client operating system and determine that the system update failed to install properly on the client operating system and the ATM has shut down. The instructions can further cause the ATM update system to execute instructions to the client operating system to boot the client operating system from the bootable image on the virtual hard drive. The instructions can further cause the system to emulate the client operating system on the ATM from the virtual hard drive without loading the client operating system. The instructions can further cause the system to install a rolled-back operating system on to the ATM from the virtual hard drive. The rolled-back operating system can comprise the back-up system image of the client operating system.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present disclosure in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the disclosure discussed herein. In similar fashion, while exemplary examples can be discussed below as device, system, or method examples, it is to be understood that such exemplary examples can be implemented in various devices, systems, and methods of the present disclosure.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner

DETAILED DESCRIPTION

As described above, a problem with current automatic teller machines (ATMs) is that broken ATMs must remain out of service until a dedicated service technician can physically attend to the ATM to bring the machine back online. Because ATMs exist as such specialized machines, current ATM update deployment environments lack the ability to rollback a machine after an update deployment. This means that if an update deployment or other change to the ATM leaves the machine in a non-functional state, the machine must be freshly imaged, which can take several hours of downtime.

Examples of the present disclosure can comprise systems and methods for providing contextualized reviews. Such methods can store a back-up system image of a client operating system on a virtual hard drive. When an update is deployed from a host operating system to the client operating system, the system update may fail to install properly, and the ATM may shut down. In response, the host operating system can execute instructions to the client operating system to boot from a bootable image on the virtual hard drive. Then, the virtual hard drive can emulate, by a boot loader on the back-up system image, the client operating system on the ATM from the virtual hard drive without loading the client operating system. Then, the virtual hard drive can install a rolled-back operating system on the ATM. The rolled-back operating system can comprise the back-up system image.

The method can then receive a patch that has altered the system update to create a patched system update intended for the client operating system, and the method can deploy the patched system update to the rolled-back operating system on the ATM. Responsive to deploying the patched system update to the rolled-back operating system, the method can determine that the patched system update failed to install properly on the rolled-back operating system and that the ATM has shut down. In response, the method can run instructions from the host operating system to the rolled-back operating system to access the file system of the virtual hard drive. Furthermore, the method can automatically instruct the host operating system to terminate the deployment of system updates to the ATM. Alternatively, or in addition, the method can transmit an alert from the host operating system that the ATM requires service by a technician, and/or the method can cause a user interface (UI) of the ATM to display a graphical user interface (GUI) indicating that the ATM is out of service.

For ease of explanation, the systems and methods described herein are described with respect to an ATM. One of skill in the art will recognize, however, that the disclosure is not so limited and that the systems and methods could also be used on other applications. Instead of ATM, the system could be used in conjunction with, for example, self-checkout at grocery, and other, stores, vending machines of all sorts, currency exchange, ticket sales, etc. These, and other applications, are contemplated herein.

In addition, although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to exemplary examples of the disclosed technology, examples of which are illustrated in the accompanying drawings and disclosed herein. Wherever convenient, the same references numbers will be used throughout the drawings to refer to the same, or like, parts.

Figure 1:
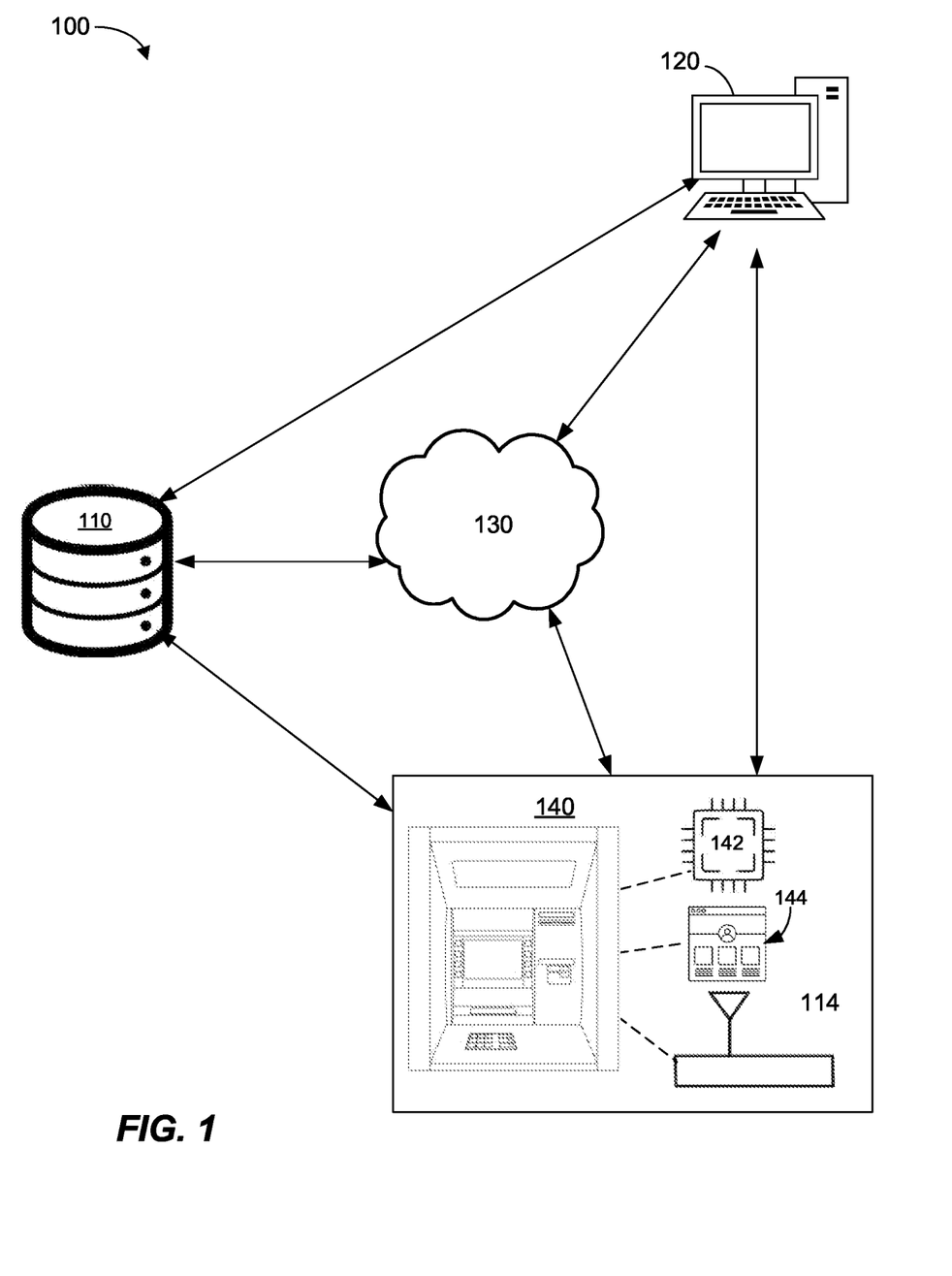
FIG. 1 illustrates a component diagram of an example of an automatic teller machine (ATM) update system according to some examples of the present disclosure.

FIG. 1 illustrates another example of an ATM update system 100. The components and arrangements shown in FIG. 1 are not intended to limit the disclosed examples as the components used to implement the disclosed processes and features can vary. As shown, the ATM update system 100 can include an ATM 140. The ATM 140 can include one or more processors 142, a memory 114, and a graphical user interface (GUI) 144. The ATM 140 can include and/or communicate with a virtual hard drive 110. The components of the ATM update system 100 can also be configured to communicate via a network 130.

In some examples, the ATM update system 100 can include a computing device 120. The computing device 120 can be implemented by a financial institution, merchant, organization, or other such entity. The computing device 120 can also implement a host operating system that can communicate with the virtual hard disk 110 and/or one or more external storage devices. The host operating system can also be configured to communicate with directly with the ATM 140 as well as other components of the ATM update system 100. In some examples, the computing device 120 can be configured to package and/or push out updates to the ATM update system 100. The updates can be from the organization implementing the computing device 120. For example, the computing device 120 can update the host operating system and push out the same update to the ATM 140 to update a client operating system on the ATM 140.

The computing device operating on the host operating system 120 can include one or more of a mobile device, smart phone, general purpose computer, tablet computer, laptop computer, telephone, a public switched telephone network (PSTN) landline, smart wearable device, voice command device, other mobile computing device, or any other device capable of communicating with a network and/or with one or more components of the ATM update system 100.

In some examples, the organization corresponding to the computing device 120 can be associated with, for example, a business, corporation, individual, partnership, or any entity that can provide financial services or processes financial transactions such as a bank, a credit card company, retailer, or the like. In some examples, the organization can provide goods and services. Although the organization is shown by the host operating system 120 in FIG. 1, in some examples, some or all of the elements of the organization and the computing device 120 can be separate and/or separate entities used in conjunction with each other.

The virtual hard drive 110 capture and/or maintain backup images of the state of the ATM 140 and/or the computing device 120. For example, the virtual hard drive 110 can store a system image of a client operating system on the ATM 140. In some examples, the virtual hard drive 110 can be stored in a partition on a physical storage device, such as a hard disk. The virtual hard drive 110 can further comprise a boot loader and/or one or more boot files to allow the ATM 140 to boot directly from the virtual hard drive 110. In some examples, the boot loader and/or the one or more boot files can create a bootable image on the virtual hard drive 110. The bootable image can be the system image captured by the virtual hard drive 110 or a separate bootable image file.

Figure 2:
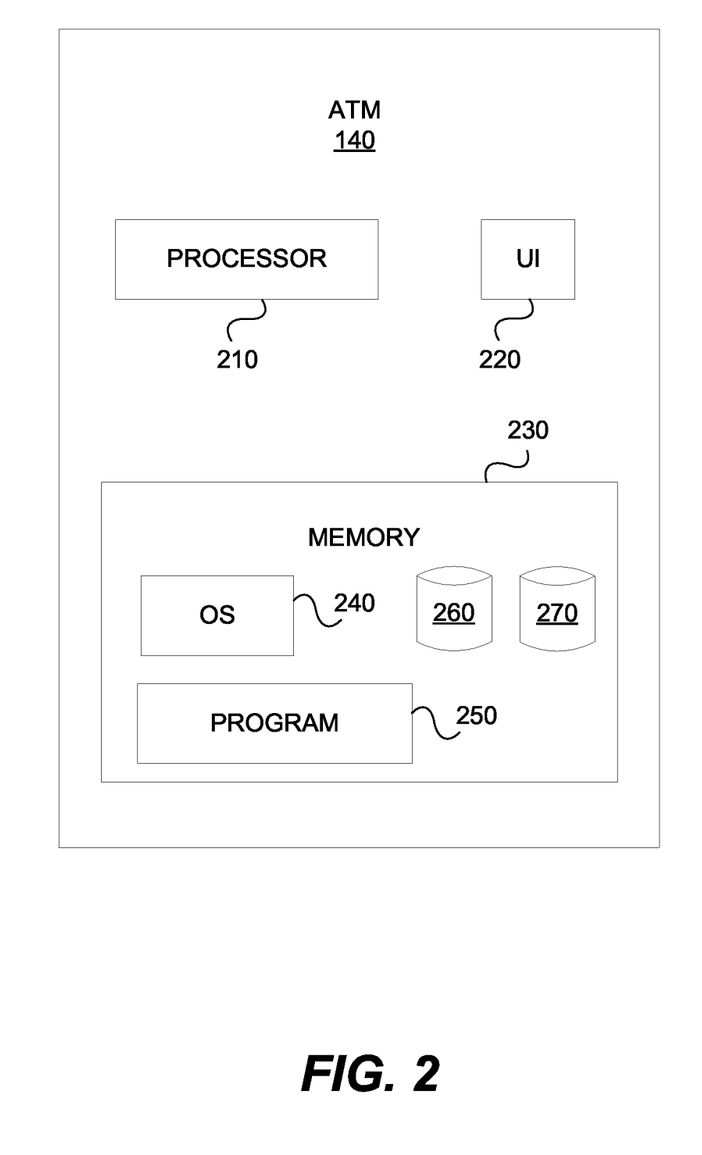
FIG. 2 illustrates a component diagram of an ATM used in an ATM update system according to some examples of the present disclosure.

An example of an ATM 140 is shown in more detail in FIG. 2. While FIG. 2 is illustrated and described with respect to the ATM 140, it is to be understood that the example of the ATM 140 is merely illustrative, and that the illustrations within FIG. 2 can comprise one or more additional components of the ATM 140 that would be understood by one of ordinary skill in the art.

As shown, the ATM 140 can include a processor 210; a user interface (UI) 220; a memory 230, which can contain a client operating system (OS) 240; a storage device 260, which can be any suitable repository of data; a program 250, which can include any programs suitable to operate the ATM 140; and a financial instrument storage 270. In some examples, the ATM 140 can also include a communication interface, such as a transceiver, to communicate with the network 130 and/or other components of the ATM update system 100. In some examples, the ATM 140 can further include a peripheral interface, a mobile network interface in communication with the processor 410, a bus configured to facilitate communication between the various components of the biometric measurement device, and/or a power source configured to power one or more components of the ATM 140. In certain examples, the ATM 140 can include a geographic location sensor (GLS) for determining the geographic location of the biometric measurement device.

Figure 3:
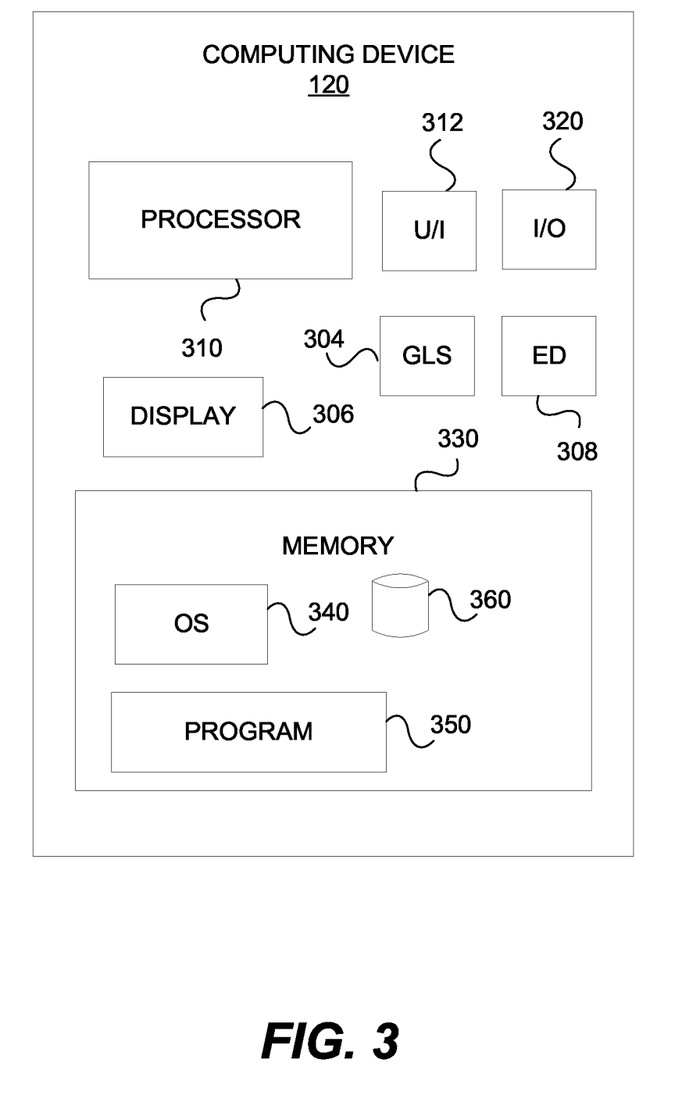
FIG. 3 illustrates a component diagram of an example of a computing device used in an ATM update system according to some examples of the present disclosure.

An example embodiment of a computing device 120 is shown in more detail in FIG. 3. While FIG. 3 is illustrated and described with respect to the computing device 120, it is to be understood that the example is merely illustrative, and that the illustrations within FIG. 3 can comprise one or more additional components of the ATM 140 that would be understood by one of ordinary skill in the art.

As shown, the computing device 120 can include a processor 310; an I/0 device 320; a memory 330 containing an OS 340 (such as a host operating system); a storage device 360, which can be any suitable repository of data; and a program 350. In some examples, the computing device 120 can include components such as an accelerometer; a gyroscope; a GLS 304 for determining the geographic location of the computing device 120; a display 306 for displaying content such as text messages, images, and selectable buttons/icons/links; an environmental data ("ED") sensor 308 for obtaining environmental data including audio and/or visual information; a U/I device 312 for receiving user input data, such as data representative of a click, a scroll, a tap, a press, or typing on an input device that can detect tactile inputs; a display; a microphone and/or an image capture device, such as a digital camera. In some examples, the computing device 120 can include a transceiver to communicate with the network 130 and/or other components of the ATM update system 100. In some examples, the computing device 120 can further include a peripheral interface, a mobile network interface in communication with the processor 310, a bus configured to facilitate communication between the various components of the computing device 120, and/or a power source configured to power one or more components of the computing device 120.

The various components of the computing device 120 can include the same or similar attributes or capabilities of the same or similar components discussed with respect to the ATM 140.

While the following methods may be described with reference to the ATM update system 100, it is understood that one or more method steps or whole methods can be performed by other similar systems disclosed herein, other systems, general-purpose computers, computer operators, and the like.

Figure 4:
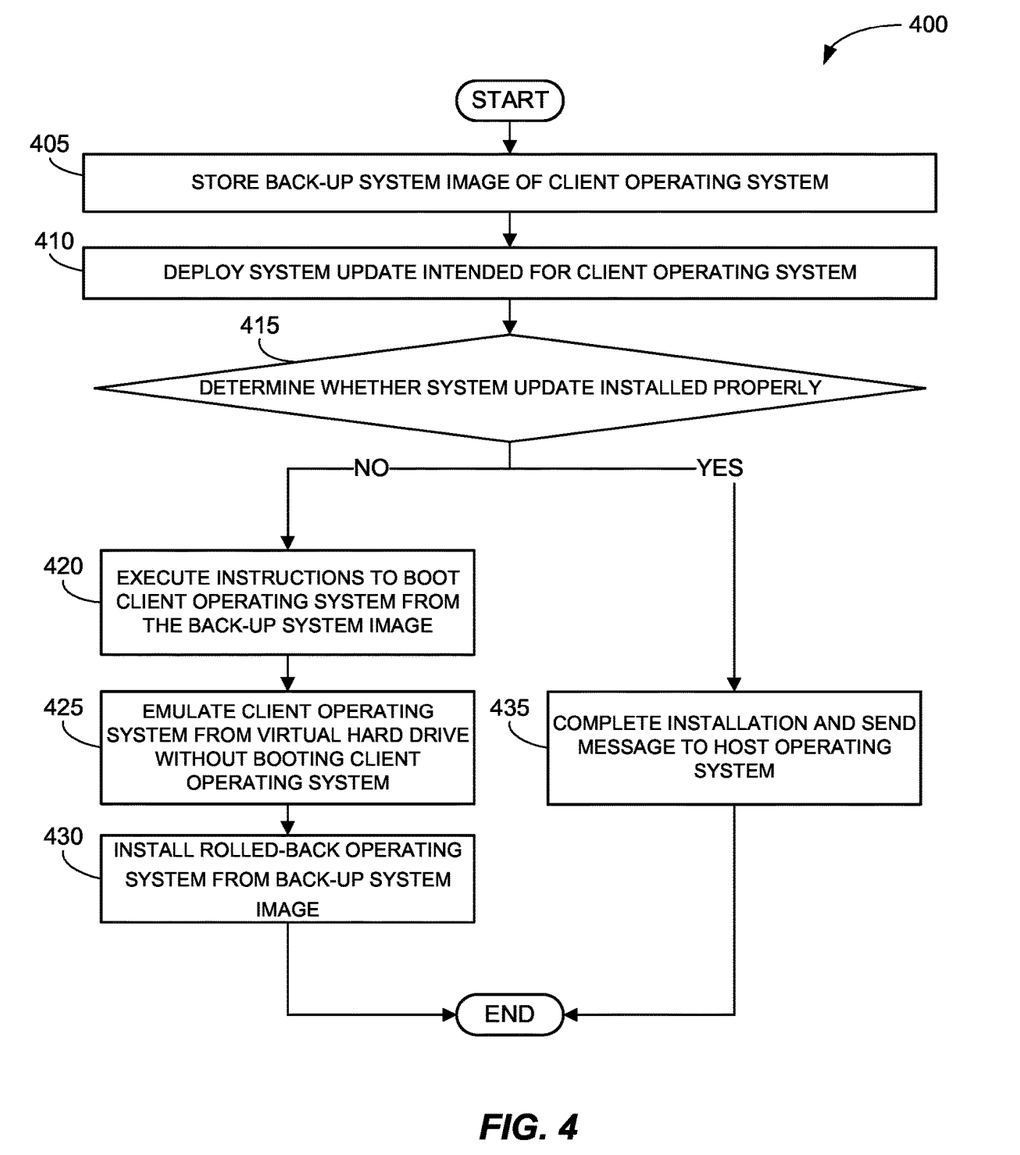
FIG. 4 illustrates a flowchart of an example method of deploying ATM updates according to some examples of the present disclosure.

FIG. 4 illustrates a flowchart of a method of deploying ATM updates 400. It is understood that the ATM update system 100 can execute the method 400 on any components disclosed therein, such as the memory 114 or the one or more processors 142. As shown in block 605, the host operating system on the computing device 120 can store a back-up system image of the client operating system on the ATM 140. Alternatively, or in addition, the host operating system can store the back-up system image on the virtual hard drive 110. The virtual hard drive can comprise a file system corresponding to the client operating system of the ATM. For example, if the client operating system is a Windows OS, the virtual hard drive can use a Windows Virtual Hard Drive (VHDX) file system.

The back-up system image can be captured automatically at predetermined intervals, or the back-up system image can be captured and stored prior to a system update being deployed. The host operating system can also implement one or more changes to the back-up system image and/or the virtual hard drive 110. For example, the host operating system can include a boot loader on the virtual hard drive 110 with the back-up system image. The host operating system can also transform the back-up system image into a bootable image, and/or the host operating system can include a separate bootable image from the back-up system image. The method 400 can then proceed on to block 410.

As shown in block 410, the host operating system on the computing device 120 can deploy a system update intended for the client operating system on the ATM 140. The host operating system can package the contents of the update prior to pushing the update out to the client operating system. The contents of the system update can be transmitted directly from the computing device 120 to the ATM 140. Alternatively, or additionally, the contents of the system update can be deployed directly from the host operating system to the client operating system. The contents of the system update, in any of the examples described herein, can also be transmitted over the network 130. The method 400 can then proceed on to block 415.

As shown in block 415, the host operating system can determine whether the system update installed properly on the client operating system. If the update installed successfully, the client operating system can transmit a notification or other indication to the host operating system that the update was successful. If the update did not install successfully, the client operating system can instruct the ATM 140 to shut down. The client operating system can also transmit a notification or other such indication to the host operating system that the ATM 140 has shut down and/or that the update has failed to install properly. If the host operating system receives an indication that the update installed properly on the client operating system, the method 400 can proceed on to block 435. If the host operating system receives an indication that the update failed to install properly and/or that the ATM 140 has shut down, the method 400 can proceed on to block 420.

As shown in block 435, the client operating system can complete the update installation onto the ATM 140. This can include certain actions, such as rebooting the ATM 140, logging into the ATM 140, reconnecting the ATM 140 to the network 130, and the like. Additionally, or alternatively, the client operating system can transmit a message to the host operating system that the update is complete. The method 400 can then terminate after block 435.

As shown in block 420, the host operating system (or the computing device 120 and/or the virtual hard drive 110) can execute instructions to the client operating system to boot the client operating system from the bootable image on the virtual hard drive 110. The bootable image can include the back-up system image, and/or the bootable image can comprise a boot script and/or one or more boot files configured to boot the back-up system image. The method 400 can then proceed on to block 425.

As shown in block 425, the virtual hard drive 110 can emulate the client operating system on the ATM 140 without loading the client operating system on the ATM 140 itself. The boot loader can be configured such that the ATM 140 can boot directly from the back-up system image utilizing a boot script and/or the one or more boot files. In such a manner, the ATM 140 can avoid costly downtime reinstalling the client operating system and/or imaging the client operating system. The ATM 140 can simply boot the client operating system directly from the virtual hard drive 110. The method 400 can then proceed on to block 430.

As shown in block 430, after booting the client operating system directly from the virtual hard drive 110, the client operating system can install a rolled-back operating system onto the ATM 140. The rolled-back operating system can comprise the back-up system image of the client operating system from prior to the update deployment. In such a manner, the client operating system and the ATM 140 can be reverted to the state of the back-up system image, before the deployed system update failed. The method 400 can then terminate after block 430. However, in certain examples, the method 400 can proceed on to other method steps not shown.

For example, the host operating system can then receive a patch for the previously deployed system update. The host operating system can then alter the system update to create a patched system update for the client operating system. The host operating system can then deploy the patched system update to the rolled-back operating system on the ATM 140. Responsive to deploying the patched system update, the host operating system can determine if the patched system update installed properly or not, as in block 415. If the patched system update also fails and/or causes the ATM 140 to shut down, the system 100 can automatically instruct the host operating system to terminate the deployment of system updates to the ATM 140. Additionally, the ATM 140 remains shut down, the host operating system can transmit an alert to the ATM 140 to display (e.g., on the UI 220 of the ATM 140) that the ATM 140 requires service by a technician.

Figure 5:
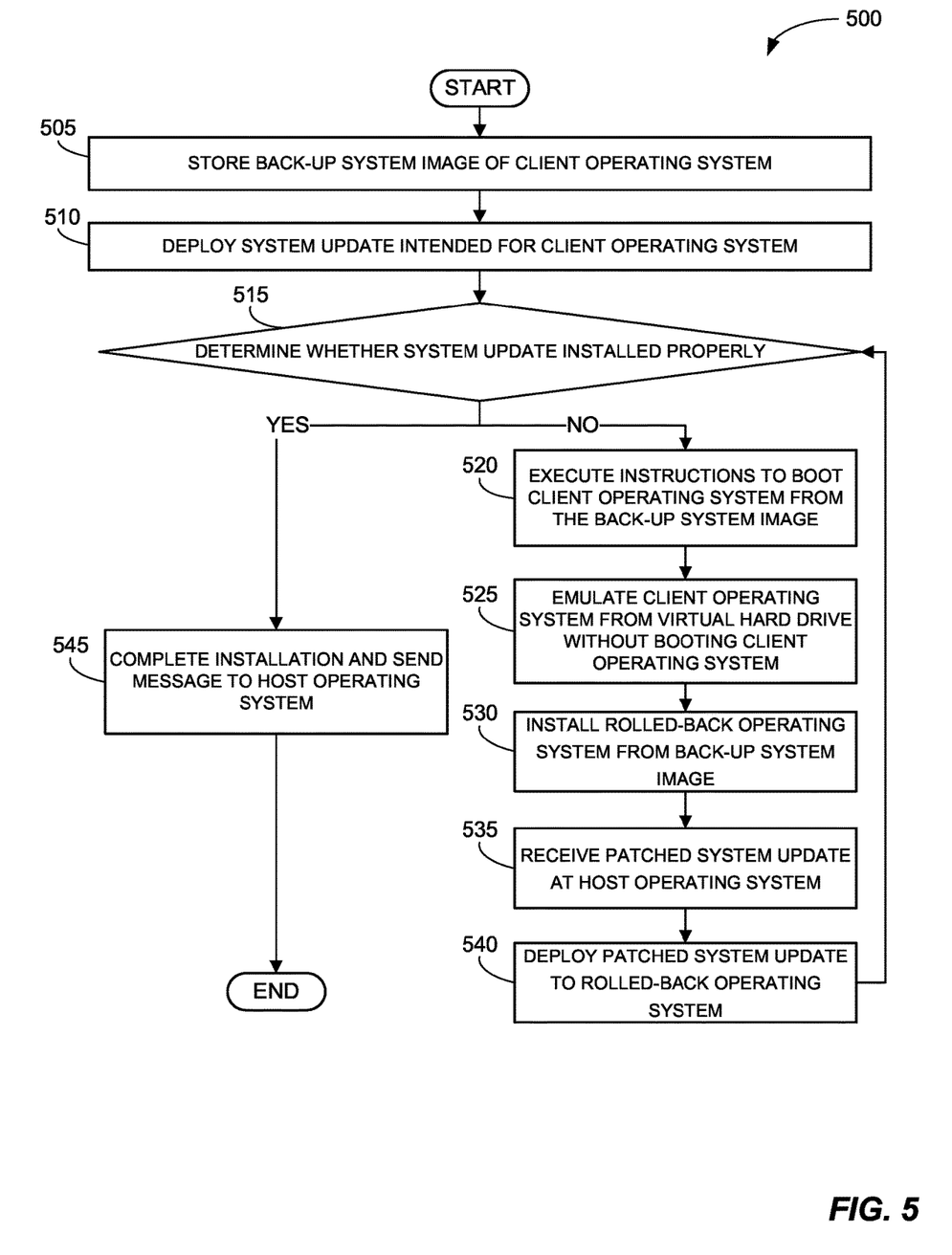
FIG. 5 illustrates a flowchart of another example method of deploying ATM updates according to some examples of the present disclosure.

FIG. 5 illustrates a flowchart of a method 500 for rolling back an update to an ATM. It is understood that the ATM update system 100 can execute the method 500 on any components disclosed therein, such as the memory 114 or the one or more processors 142. As shown in block 505, the host operating system on the computing device 120 can store a back-up system image of the client operating system on the ATM 140. Alternatively, or in addition, the host operating system can store the back-up system image on the virtual hard drive 110. The virtual hard drive can comprise a file system corresponding to the client operating system of the ATM. For example, if the client operating system is a Windows OS, the virtual hard drive can use a Windows Virtual Hard Drive (VHDX) file system.

The back-up system image can be captured automatically at predetermined intervals, or the back-up system image can be captured and stored prior to a system update being deployed. The host operating system can also implement one or more changes to the back-up system image and/or the virtual hard drive 110. For example, the host operating system can include a boot loader on the virtual hard drive 110 with the back-up system image. The host operating system can also transform the back-up system image into a bootable image, and/or the host operating system can include a separate bootable image from the back-up system image. The method 500 can then proceed on to block 510.

As shown in block 510, the host operating system on the computing device 120 can deploy a system update intended for the client operating system on the ATM 140. The host operating system can package the contents of the update prior to pushing the update out to the client operating system. The contents of the system update can be transmitted directly from the computing device 120 to the ATM 140. Alternatively, or additionally, the contents of the system update can be deployed directly from the host operating system to the client operating system. The contents of the system update, in any of the examples described herein, can also be transmitted over the network 130. The method 500 can then proceed on to block 515.

As shown in block 515, the host operating system can determine whether the system update installed properly on the client operating system. If the update installed successfully, the client operating system can transmit a notification or other indication to the host operating system that the update was successful. If the update did not install successfully, the client operating system can instruct the ATM 140 to shut down. The client operating system can also transmit a notification or other such indication to the host operating system that the ATM 140 has shut down and/or that the update has failed to install properly. If the host operating system receives an indication that the update installed properly on the client operating system, the method 500 can proceed on to block 545. If the host operating system receives an indication that the update failed to install properly and/or that the ATM 140 has shut down, the method 500 can proceed on to block 520.

As shown in block 545, the client operating system can complete the update installation onto the ATM 140. This can include certain actions, such as rebooting the ATM 140, logging into the ATM 140, reconnecting the ATM 140 to the network 130, and the like. Additionally, or alternatively, the client operating system can transmit a message to the host operating system that the update is complete. The method 500 can then terminate after block 545.

As shown in block 520, the host operating system (or the computing device 120 and/or the virtual hard drive 110) can execute instructions to the client operating system to boot the client operating system from the bootable image on the virtual hard drive 110. The bootable image can include the back-up system image, and/or the bootable image can comprise a boot script and/or one or more boot files configured to boot the back-up system image. The method 500 can then proceed on to block 525.

As shown in block 525, the virtual hard drive 110 can emulate the client operating system on the ATM 140 without loading the client operating system on the ATM 140 itself. The boot loader can be configured such that the ATM 140 can boot directly from the back-up system image utilizing a boot script and/or the one or more boot files. In such a manner, the ATM 140 can avoid costly downtime reinstalling the client operating system and/or imaging the client operating system. The ATM 140 can simply boot the client operating system directly from the virtual hard drive 110. The method 500 can then proceed on to block 530.

As shown in block 530, after booting the client operating system directly from the virtual hard drive 110, the client operating system can install a rolled-back operating system onto the ATM 140. The rolled-back operating system can comprise the back-up system image of the client operating system from prior to the update deployment. In such a manner, the client operating system and the ATM 140 can be reverted to the state of the back-up system image, before the deployed system update failed. In some examples, the install can include accessing the bootable image comprising the back-up system image and the boot loader. The boot loader can define at least one transformation to be performed on the bootable image to allow the ATM to boot from the back-up system image. For example, the boot loader can transform the back-up system image into a bootable image. Then, the boot loader can execute and thereby perform the at least one transformation during the install. In such a manner, the ATM 140 can boot using the transformed bootable image. The method 500 can then proceed on to block 535.

As shown in block 535, the host operating system can then receive a patch for the previously deployed system update. The host operating system can then alter the system update to create a patched system update for the client operating system. The patch can include, for example, one or more corrective files to remedy the failed install. The patch can also add or remove portions of the system update as desired. The patch can be created by the host operating system on the computing device 120, or the patch can be received by the host operating system from, for example, an organization. The method 500 can then proceed on to block 540.

As shown in block 540, the host operating system can deploy the patched system update to the rolled-back operating system on the ATM 140. Responsive to deploying the patched system update, the host operating system can determine if the patched system update installed properly or not, as in block 515. If the patched system update also fails and/or causes the ATM 140 to shut down again, the system 100 can automatically instruct the host operating system to terminate the deployment of system updates to the ATM 140. The host operating system can also transmit an alert that the ATM 140 requires service. The alert can be transmitted within the organization of the host operating system, or the alert can be transmitted to an external technician to service the ATM 140. The host operating system can also cause the UI 220 of the ATM 140 to display (e.g., on a graphical user interface of the UI) an alert and/or other graphic indicating that the ATM 140 is out of service. The method 500 can then terminate after block 540. However, in certain examples, the method 500 can proceed on to other method steps not shown.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Additionally, it is understood that while the present disclosure is discussed with respect to automatic teller machines (ATMs), the present technology can be used in conjunction with other remote machines, systems, update networks, general purpose computers, computing devices, and the like without departing from the intended scope of the disclosure. Therefore, the present disclosure should not be limited to any single aspect, but rather construed in breadth and scope in accordance with the appended claims.

EXEMPLARY USE CASES

The following exemplary use cases describe examples of a typical user flow pattern. They are intended solely for explanatory purposes and not limitation.

An automatic teller machine (ATM) can run on a Windows operating system. The ATM can also be in communication with a financial institution remotely over a network. Regularly, the ATM can check for software updates from the financial institution. If the financial institution has a software update to push out to all ATMs in the network, the financial institution can package the update to prepare for deployment. Then, the operating system ran by the financial institution can store a back-up system image of the current state of the ATM, including the operating system state, onto a virtual hard drive. The financial institution can also include a bootable image and a boot loader in the back-up system image.

Then, the financial institution can deploy the software update to all ATMs in the network. ATMs which are able to properly install the software update can return a message to the financial institution that the update was successful. However, the financial institution can determine which ATMs were unsuccessful in installing the software updates. Such ATMs can automatically shutdown and transmit and indication to the financial institution that they have shut down.

In response, the financial institution can execute instructions to each ATM to boot the Windows operating system from the bootable image on the virtual hard drive. The virtual hard drive can emulate the Windows operating system on each ATM using the boot loader in the back-up system image without loading the original ATM operating system. Then, the virtual hard drive can install a rolled-back version of the ATM operating system on each ATM. The rolled-back operating system can comprise the back-up system image. In such a manner, the ATM can be restored to its previous functionality before the software update.

By way of another example, the instructions to boot the client operating system from the bootable image on the virtual hard drive are described below in a typical user flow pattern. They are intended solely for explanatory purposes and not limitation.

First, the host operating system can create a system image of the client operating system. Based on the system image of the client operating system, the instructions can instruct the host operating system to create a new partition of the virtual hard drive before the host operating system transmits an update. The instructions can further instruct the host operating system to copy customization files from the system image to the partition of the virtual hard drive. The instructions can further instruct the host operating system to copy installation files from the system image to the virtual hard drive. The installation files can include a bootable image and the boot files for booting the client operating system. The instructions can further instruct the host operating system to apply the installation files to the ATM. Such instructions can cause the ATM to boot the client operating system from the virtual hard drive. The instructions can instruct the ATM to install the system image of the client operating system from the virtual hard drive.

What is claimed is:

1. A method for rolling back an update to an automatic teller machine (ATM), comprising:
   creating, by a host operating system, a virtual hard drive comprising a file system corresponding to a client operating system of the ATM, the virtual hard drive configured to automatically capture a back-up system image of the client operating system at predetermined intervals;
   storing, by the host operating system, the back-up system image of the client operating system on the virtual hard drive to create a bootable image of the ATM, the bootable image comprising the backup system image of the client operating system and a boot loader that defines at least one transformation to be performed on the bootable image to allow the ATM to boot directly from the virtual hard drive via the back-up system image;
   deploying, from the host operating system, a system update intended for the client operating system;
   determining that the system update failed to install properly on the client operating system and that the ATM has shut down;
   emulating, by the host operating system, the virtual hard drive on the ATM without loading the client operating system;
   executing the boot loader to thereby perform the at least one transformation on the bootable image;
   booting the ATM using the transformed bootable image;
   installing, from the virtual hard drive, a rolled-back operating system on to the ATM, the rolled-back operating system comprising the back-up system image of the client operating system;
   receiving a patch that has altered the system update to create a patched system update intended for the client operating system; and
   deploying, from the host operating system, the patched system update to the rolled-back operating system on the ATM.

2. The method of claim 1, further comprising:
   responsive to deploying the patched system update to the rolled-back operating system, determining that the patched system update failed to install properly on the rolled-back operating system and that the ATM has shut down.

3. The method of claim 2, further comprising:
   running, by the host operating system, instructions to the rolled-back operating system to access the file system of the virtual hard drive.

4. The method of claim 2, further comprising:
   automatically instructing the host operating system to terminate deployment of system updates to the ATM.

5. The method of claim 2, further comprising:
   transmitting, by the host operating system, an alert that the ATM requires service by a technician.

6. The method of claim 2, further comprising:
   causing a user interface (UI) of the ATM to display a graphical user interface (GUI) indicating that the ATM is out of service.

7. An automatic teller machine (ATM) update system, comprising:
   one or more processors; and
   a memory storing instructions that, when executed by the one or more processors, cause the ATM update system to:
      create, by a host operating system, a virtual hard drive comprising a file system corresponding to a client operating system of the ATM, the virtual hard drive configured to automatically capture a back-up system image of the client operating system at predetermined intervals;
      store, on the host operating system comprising a virtual hard drive, the back-up system image of the client operating system, the back-up system image comprising a bootable image and a boot loader to create a bootable image of the ATM, the bootable image comprising the back-up system image of the client operating system, the boot loader defining at least one transformation to be performed on the bootable image to allow the ATM to boot directly from the virtual hard drive via the back-up system image;
deploy a system update intended for the client operating system;
determine that the system update failed to install properly on the client operating system and that the ATM has shut down;
execute instructions to the client operating system to boot the client operating system from the bootable image on the virtual hard drive;
emulate the client operating system on the ATM from the virtual hard drive without loading the client operating system;
execute the boot loader to thereby perform the at least one transformation on the bootable image;
boot the ATM using the transformed bootable image; and
install, from the virtual hard drive, a rolled-back operating system on to the ATM, the rolled-back operating system comprising the back-up system image of the client operating system.

8. The ATM update system of claim 7, wherein the instructions further cause the ATM update system to:
receive a patch that has altered the system update to create a patched system update intended for the client operating system; and
deploy, from the host operating system, the patched system update to the rolled-back operating system on the ATM.

9. The ATM update system of claim 8, wherein the instructions further cause the ATM update system to:
responsive to deploying the patched system update to the rolled-back operating system, determine that the patched system update failed to install properly on the rolled-back operating system and that the ATM has shut down.

10. The ATM update system of claim 9, wherein the instructions further cause the ATM update system to:
execute, by the host operating system, instructions to the rolled-back operating system to boot the client operating system from the bootable image on the virtual hard drive.

11. The ATM update system of claim 9, wherein the instructions further cause the ATM update system to:
automatically instruct the host operating system to terminate deployment of system updates to the ATM.

12. The ATM update system of claim 9, wherein the instructions further cause the ATM update system to:
transmit an alert to the ATM for display that indicates the ATM requires service by a technician.

13. The ATM update system of claim 9, wherein the instructions further cause the ATM update system to:
cause a user interface (UI) of the ATM to display a graphical user interface (GUI) indicating that the ATM is out of service.

14. A method of deploying ATM updates, the method comprising:
creating, by a host operating system, a virtual hard drive comprising a file system corresponding to a client operating system of the ATM, the virtual hard drive configured to automatically capture a back-up system image of the client operating system at predetermined intervals;
storing, on the virtual hard drive, the back-up system image of the client operating system automatically captured at a predetermined interval by the virtual hard drive, the back-up system image comprising a bootable image and a boot loader that defines at least one transformation to be performed on the bootable image to allow the ATM to boot directly from the virtual hard drive via the back-up system image;
deploying, from a host operating system, a system update intended for the client operating system;
determining that the system update failed to install properly on the client operating system and that the ATM has shut down;
executing, by the virtual hard drive, instructions to the client operating system to boot the client operating system from the bootable image on the virtual hard drive;
emulating, by the boot loader on the back-up system image, the client operating system on the ATM from the virtual hard drive without loading the client operating system;
executing the boot loader to thereby perform the at least one transformation on the bootable image;
booting the ATM using the transformed bootable image; and
installing, from the virtual hard drive, a rolled-back operating system on to the ATM, the rolled-back operating system comprising the back-up system image of the client operating system.

15. The method of deploying ATM updates of claim 14, further comprising:
receiving a patch that has altered the system update to create a patched system update intended for the client operating system; and
deploying, from the host operating system, the patched system update to the rolled-back operating system on the ATM.

16. The method of deploying ATM updates of claim 15, further comprising:
responsive to deploying the patched system update to the rolled-back operating system, determining that the patched system update failed to install properly on the rolled-back operating system and that the ATM has shut down.

17. The method of deploying ATM updates of claim 16, further comprising:
automatically instructing the host operating system to terminate deployment of system updates to the ATM.

18. The method of deploying ATM updates of claim 16, further comprising:
transmitting, by the host operating system to the ATM, an alert for display that the ATM requires service by a technician.

* * * * *